United States Patent [19]

Aultman et al.

[11] Patent Number: 4,458,414
[45] Date of Patent: Jul. 10, 1984

[54] METHOD OF MANUFACTURING A LOW LEAKAGE CAPACITOR HEADER

[75] Inventors: William H. Aultman, Pickens; Morris T. Reese, Taylors, both of S.C.

[73] Assignee: Sangamo Weston, Inc., Norcross, Ga.

[21] Appl. No.: 334,289

[22] Filed: Dec. 24, 1981

[51] Int. Cl.³ ............................................ H01R 43/04
[52] U.S. Cl. .................................... 29/882; 29/522 R
[58] Field of Search ..................... 29/882, 874, 25.41, 29/739, 522, 522 A; 361/433

[56] References Cited

U.S. PATENT DOCUMENTS

| | | | |
|---|---|---|---|
| 1,900,099 | 3/1933 | Ferguson | 29/739 X |
| 1,914,650 | 6/1933 | Reutter | 29/882 X |
| 2,961,633 | 11/1960 | Kuebler | 29/522 X |
| 3,341,751 | 9/1967 | Clement | 361/433 |
| 3,398,333 | 8/1968 | Zeppieri . | |
| 3,446,908 | 5/1969 | Tally et al. | 29/522 X |
| 4,074,417 | 2/1978 | Pearce et al. . | |
| 4,183,600 | 1/1980 | Schroeder . | |

Primary Examiner—Howard N. Goldberg
Assistant Examiner—Carl J. Arbes
Attorney, Agent, or Firm—Dale Gaudier

[57] ABSTRACT

A capacitor header having the mechanical characteristics of a modulus of elasticity in the range from 50,000 to 200,000 psi and a tensile strength in the range from 3,500 to 80,000 psi has pressure formed therein on the aluminum terminal of which portions thereof have been increased in the range of 0.002 to 0.020 inch larger than the holes provided in the header.

9 Claims, 2 Drawing Figures

METHOD OF MANUFACTURING A LOW LEAKAGE CAPACITOR HEADER

FIELD OF THE INVENTION

The present invention relates generally to electrical devices and more particularly to a terminal header for aluminum electrolytic capacitors which provides a superior seal against vapor transmission and electrolyte leaks from a capacitor.

BACKGROUND OF THE INVENTION

In particular, this invention relates to that class of electrolytic capacitors called "computer type" capacitors which are intended for mounting on printed circuit boards of sophisticated electronic devices such as computers. The main feature of such capacitors is a life requirement of ten years or more at normal use temperatures which may range as high as 85° C.

The life of a capacitor is appreciably shortened when solvent vapor and/or electrolyte fluid escape past terminals in the header. Further, a capacitor which leaks electrolyte is undesirable because the electrolyte may attack the printed circuit board to which the capacitor is connected or provide a conductive path between the runs on the printed circuit board.

The standard construction for over twenty five years employed a plastic header with two molded-in, threaded aluminum terminals of the type shown in Collins et al (U.S. Pat. No. 3,789,502) with the plastic being molded around the terminals generally as shown in Pearce et al (U.S. Pat. No. 4,074,417).

The standard construction, in addition, does not lend itself to soldered connections to the copper runs on the ordinary printed circuit board in common use. Often a mounting bracket is required and external connections must be made by means of wires with terminal lugs which attach to the capacitor terminals by screws with lock washers.

Zeppieri (U.S. Pat. No. 3,398,333) and Schroeder (U.S. Pat. No. 4,183,600) both teach prior art capacitors in which an aluminum serrated shank terminal extends through a thermal plastic header. In both these patents, the aluminum terminal is resistance heated to a temperature such that the length of the terminal is collapsed and the center diameter increases to press the serrations into the melted plastic. However, the terminal necessarily has low strength when heated, as evidenced by the fact that the very low pressure of 75 psi is specified in Schroeder in order to expand the diameter. It is therefore obvious that only an extremely light interference fit can be developed between the terminal and the header. Schroeder further refers to the problem of thermal cycling as requiring a gasket under the enlarged end of the terminal as improvement on Zeppieri. This indicates that the interference fit is inadequate and adequate sealing of the terminal cannot be obtained without an additional gasket.

Another requirement for computer type capacitors is that they be immune to de-fluxing agents used in the cleaning and/or manufacture of the printed circuit boards which have been wave soldered. For example, residual amounts of a chlorinated solvent, such as methylene chloride, which remain on the capacitor after processing the printed circuit board, can attack and destroy aluminum terminals which must operate at anodic potential. It is the standard practice in the aluminum electrolytic capacitor industry to place protective epoxy over capacitor terminals if exposure is expected. Such protection is costly and takes up space.

An example of such a solvent is Dupont Freon® TMC (disclosed in U.S. Pat. No. 2,999,817) which is used to clean fluxes from printed circuit boards. Nonepoxy protected capacitors when soaked at 25° C. in Freon TMC for four hours and then submitted to a normal life test, fail before completion of the life test.

SUMMARY

In a low leakage capacitor header and manufacturing method therefor, a capacitor header in which the metal terminal seals directly to the plastic header with an interference fit so that volatile constituents of the solvent in the electrolyte can pass through the seal only at a very slow rate in the order of one fifth of a milligram per hour of life at 105° C. and the seal between the terminal and the header limits the leak rate to around 0.4 standard equivalent nanocubic centimeters of air per second. The force applied to deform the terminal and achieve a seal is in the order of 3,000 pounds for a 0.175 inch diameter terminal.

The present invention further provides a solderable capacitor meeting the ten or more year life requirement at normal temperatures which does not require a protective epoxy coating of the terminals to protect aluminum terminal parts operating at anodic potential.

The above and additional advantages of the present invention will become apparent to those skilled in the art from a reading of the following detailed description when taken in conjunction with the accompanying drawings.

DESCRIPTION OF THE PREFERRED EMBODIMENT

Figure 1:
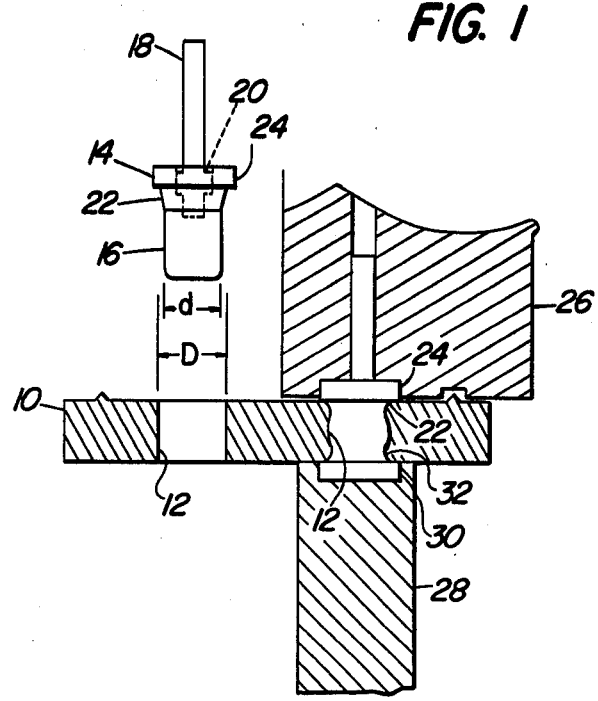
FIG. 1 is the drawing of the parts and manufacturing operation of the present invention.
Figure 2:
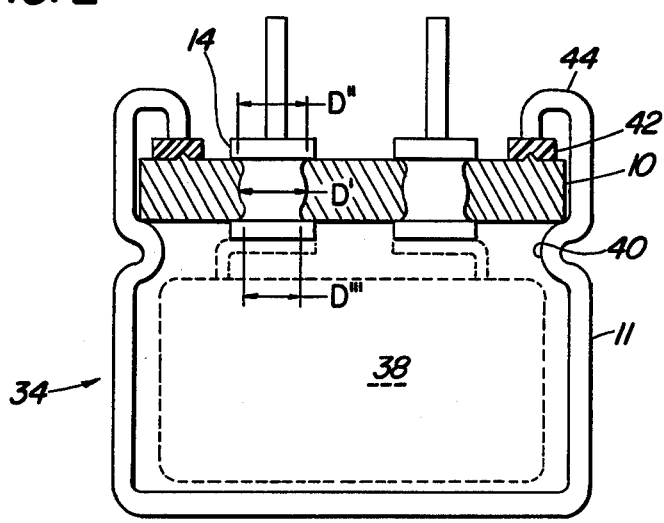
FIG. 2 is a cross section of a completed device emobodying the present invention.

Referring now to FIG. 1, therein is shown a disc shaped capacitor header 10 which is the closure member for a capacitor housing 11 (shown on FIG. 2). It has been established that the header 10 should be made of a plastic having the mechanical characteristics of a modulus of elasticity in the range from 50,000 to 200,000 pounds per square inch (psi) and a tensile strength in the range from 3,500 to 80,000 psi. Among the plastics which are acceptable are polypropylene and several polyamides, such as Nylon 6 and Nylon 6—6. Other plastics having the requisite mechanical characteristics are acceptable such as polyesters, acetals, and polyethylene depending upon the maximum temperature requirements and the solvents in the capacitor to which the material will exposed. For capacitors rated for 105° C., and having dimethyl formamide as a solvent, the preferred material is Nylon.

Materials, which have mechanical characteristics which are unsatisfactory for practising the present invention, include the polyphenylene sulfides like Phillips Petroleum Ryton which is too brittle and certain fluoroelastomers like DuPont Teflon which is subject to excessive cold flow at normal operating temperatures.

In order to increase the tensile strength, various fillers may be used with the plastics such as talc, calcium carbonate, mica and various other mineral fillers. The preferred material is short fiber glass of an amount in the range of five to forty percent with a preferred amount of thirty percent. The short fiber glass is preferred in that it raises the strength at high temperatures, is inexpensive, and is very effective in preventing cold flow.

The capacitor header 10 is provided with two holes 12. Each of the holes has an initial diameter "D". For capacitors in the 0.75 to 1.375 inch diameter range, the tolerance of the hole is generally plus 0.003 or minus 0.000 inch.

Also shown in FIG. 1, prior to insertion into one of the holes 12 is an aluminum terminal 14 having a body portion 16 with a diameter "d" which is smaller than D and has a tolerance of plus 0.000 or minus 0.003 inch. The body portion 16 also has a solderable pin 18, generally of copper, conductively joined at 20 to the body portion 16. The body portion 16 further includes an upper taper 22 and a head portion 24 which has a larger diameter than D such that the aluminum terminal 14 will not pass through the hole 12.

The mechanical characteristics of the terminal 14 include a modulus of elasticity in the range from two million to eleven million psi and a yield strength in the range from ten thousand to eighty thousand psi. Above the range, excessive deformation forces will be required and below the range, a material softer than aluminum will be required.

During the manufacturing operation, also shown in FIG. 1, a top die block 26 is positioned over the solderable pin 18 and the head portion 24. A lower forming die 28 then applies pressure to the bottom of the body portion 16 to cause plastic deformation thereof. The force applied for deformation is in the order of three thousand pounds for a 0.175 inch diameter terminal. During the pressure forming process, a lower head 30 is formed as well as a lower taper 32. During the process the diameter d of the body portion 16 is also increased.

Referring now to FIG. 2, therein is shown a cross section of an assembled capacitor 34 consisting of a container 11 with interior components 38 which are not shown in detail. The container 11 is provided with a header support identation 40 upon which the header 10 rests. The header 10 is sealed by a gasket 42 which is compressed in place by a rolled over lip 44 of the container 11.

In the final capacitor 34, the terminal 14 has a body portion diameter of D' while the upper and lower tapers having maxiumum diameters of D" and D'", respectively.

Through experimentation, it has been determined that the expanded diameters D', D", D'" should be in the range of 0.002 to 0.020 inch larger than the diameter of the hole 12 after cold flow has occurred. The oversizing of a diameter of a part relative to the hole it goes into is commonly referred to as an interference fit. If the terminal is expanded below the range, insufficient sealing will be provided while above the range, the plastic material will be subject to fracture failures; both situations result in loss of solvent vapors and electrolyte. During production development, it was determined that the optimal expanded diameters should be in the range of 0.006 and 0.010 inch interference fit in order to insure adequate sealing while avoiding breakage of or leakage past the header 10 under the maximum and minimum tolerance conditions of the two parts.

The manner in which it is determined that the proper interference fit has been achieved is empirically by the simple expedient of taking a sample and cutting the header 10 away from the terminals, measuring the final hole diameter and the appropriate diameters of the terminal. The hole diameter should be smaller than the terminal diameters within the range specified above.

The theory of operation of the present invention is that an interference fit is created between the capacitor header 10 and the terminal 14 which provides a high pressure seal. Analogizing this in theory to the heat shrink fit achieved between metal parts by heating the outer of two concentric metal rings which have interfering outside and inside diameters at normal temperatures and then assembling the hot ring over the cold ring, allows the determination of the sealing pressure. The theoretical analysis is based on Timoshenko's equation in "Strength of Materials" Part II, S. Timoshenko, D. VanNostrand, New York, New York, 1948, page 241ff. The approximate stress is:

$$P = \frac{I}{b\left(\frac{K}{E_p} + \frac{.67}{E_a}\right)} \text{ and } K = \frac{b^2 + .04}{.04 - b^2} + .45$$

where:
P=stress between the terminal and plastic (psi)
b=terminal radius (inch)
I=interference fit (inch)
$E_p$=modulus of elasicity of plastic (psi)
$E_a$=modulus of elasicity of aluminum (psi)
Note: It is assumed for purposes of these calculations that the plastic has an effective diameter of 0.4 inch for stress, which does in fact yield reasonable results.

For a 0.143 inch diameter terminal, b=0.0715, and $$K = \frac{(.0715)^2 + .04}{.04 - (.0715)^2} + .45 = 1.743$$

Now $E_p$ for nylon 6 is $0.11 \times 10^6$ psi, and $E_a$ for aluminum is $3 \times 10^6$ psi. From the equation above, the stress between parts is:

$$P = \frac{I}{.0715\left(\frac{1.743}{.11 \times 10^6} + \frac{.67}{3 \times 10^6}\right)} = \frac{I}{1.149 \times 10^{-6}}$$

This indicates a stress in the range of 1740 psi to 17400 psi for proper sealing without fracture (0.002 to 0.020 interference fit).

The following examples will serve to illustrate the advantages of the present invention:

EXAMPLE 1

A group of capacitors rated at 15,000 microfarads 6.3 VDC in a 1.375 inch diameter by 2.125 inch length case with a dimethyl formamide solvent electrolyte (as taught in Schwarz et al 2,934,682) and Hand (3,502,947) was constructed. The headers were of Nylon 6/6 with two aluminum terminals.

|  | Weight Loss at 105° C. after 1000 hours | Weight Loss at 105° C. after 5000 hours |
|---|---|---|
| Standard Capacitor | 2000 milligram | 10000 milligrams |
| Low Leakage Capacitor | 300 milligrams | 2700 milligrams |

EXAMPLE 2

A group of capacitors rated at 14,000 microfarads 28 VDC, in a 1.375 inch diameter by 3.625 inch length case with the dimethyl formamide solvent electrolyte was constructed. The headers were of Nylon 6/6 with two aluminum terminals.

|  | Weight Loss at 105° C. after 1000 hours | Weight Loss at 105° C. after 5000 hours |
| --- | --- | --- |
| Standard Capacitor | 2000 milligram | 10000 milligrams |
| Low Leakage Capacitor | 180 milligrams | 1500 milligrams |

EXAMPLE 3

A group of capacitors rated at 5,300 microfarads 50 VDC in a 1.375 inch diameter by 4.125 inch length with dimethyl formamide solvent electrolyte was constructed. The headers were of Nylon 6/6 with two aluminum terminals. The test period was 1000 hours.

|  | Test temperature | Test voltage | Weight loss |
| --- | --- | --- | --- |
| Standard Capacitor | 85° C. | 50 volts | 450 milligrams |
| Low Leakage Capacitor | 105° C. | 50 volts | 200 milligrams |
|  | 85° C. | 60 volts | 60 milligrams |

EXAMPLE 4

A group of capacitors rated at 6,400 microfarads 40 VDC, in a 1.375 inch diameter by 4.625 inch length case with dimethyl formamide solvent electrolyte. The standard capacitor had a header manufactured with standard glass filled polypropylene and molded in screw thread terminals as taught in Philpott et al (U.S. Pat. No. 4,208,699) which is considered one of the best designs in the industry. The low leakage header was of Nylon 6/6. The test period was 1000 hours.

|  | Test temperature | Test voltage | Weight loss in |
| --- | --- | --- | --- |
| Standard Capacitor | 105° C. | 40 volts | 2000 milligrams |
|  | 85° C. | 40 volts | 450 milligrams |
| Low Leakage Capacitor | 105° C. | 40 volts | 180 milligrams |
|  | 95° C. | 40 volts | 40 milligrams |

EXAMPLE 5

A group of capacitors with a rating of 750 microfarads 40 VDC in a 0.75 inch diameter by 2.125 inch length case was constructed. The headers were constructed of Adell AR-18 40% glass filled Nylon 6-6 and had three terminals. The gasket material was ethylenepropylene elastomer. The test duration was 1000 hours.

|  | Test temperature | Test voltage | Weight loss in |
| --- | --- | --- | --- |
| Standard Capacitor | 105° C. | 40 volts | 200 milligrams |
| Low Leakage Capacitor | 125° C. | 40 volts | 570 milligrams |
|  | 105° C. | 40 volts | 150 milligrams |

The general rule of thumb is that the approximate expected life can be calculated from 1/5 the weight of solvent in the capacitor, divided by the weight loss per hour. This gives an expected life for the capacitors of the present invention of 1000 or more hours as compared to the standard capacitor which has an expected life of 3000 hours at 105° C.

When the header to terminal seal is tested by use of a Veeco model MS-17AM helium leak detector, the leak rates of all the headers remain less than one standard nanocubic centimeter equivalent of air per second during the test. A standard capacitor would generally leak 100 standard nanocubic centimeter equivalents of air per second.

Further, when capacitors headers according to the present invention are subject to thermocycling for ten cycles at a minimum from 125° C. to liquid nitrogen temperature, 98° K. or −176° C., with one cycle performed each day, and then tested by using the helium leak detector test, the leak rates remain less than one standard equivalent nanocubic centimeter of air per second while standard capacitors fail by steadily increasing leak rates.

Another advantage of the present invention is that it is not necessary to protect the terminals with protective epoxy. The present invention capacitors are capable of surviving a soaking at 25° C. in Freon TMC for four hours and then surviving a normal life test.

As many possible embodiments may be made of the invention without departing from the scope thereof, it is to be understood that all matters set forth herein or shown in the accompanying drawings is to be interpreted in an illustrative and not limiting sense.

What is claimed is:

1. A method of manufacturing a capacitor header comprising the steps of:
   (a) forming a header having the mechanical characteristics of a modulus of elasticity in the range from 50,000 to 200,000 psi and a tensile strength in the range from 3,500 to 80,000 psi into a substantially cylindrical configuration having at least one circular through hole provided therein of a predetermined diameter;
   (b) forming at least one cylindrical terminal having a diameter smaller than said predetermined diameter of each said through hole, each said terminal being formed as a solid, unitary body from an electrically conductive material and having a modulus of elasticity in the range from 2 million to 11 million pounds per square inch and a yield strength in the range from 10,000 to 80,000 psi;
   (c) inserting each said cylindrical terminal into each said through hole;
   (d) applying pressure in excess of the yield strength of each said terminal to at least one end of each of said terminals; and
   (e) deforming each said terminal until a portion thereof reaches a diameter in the range of 0.002 to 0.020 inch larger than said predetermined diameter of the through hole into which it has been inserted.

2. The method as claimed in claim 1 including the additional steps of:
   (a) forming a taper on each said terminal prior to insertion thereof in said header, said taper formed to have maximum and minimum diameters respectively larger and smaller than said predetermined diameter; and
   (b) deforming each said terminal further until the maximum and minimum diameters of said taper are respectively smaller or larger than 0.020 inch and 0.002 inch, respectively, than said predetermined diameter.

3. The method as claimed in claim 2 including the additional steps of:
deforming each said terminal further until the end of said terminal away from said taper forms on additional taper having maximum and minimum diameters respectively smaller or larger than 0.020 and 0.002 inch, respectively, than said predetermined diameter.

4. The method as claimed in claim 3 including the additional steps of:
(a) forming a head on said taper end of each said terminal prior to inserting said terminal in said header; and
(b) deforming each said terminal to form a second head on said terminal opposite said first mentioned head.

5. The method as claimed in claim 1, 2, 3, or 4 including the additional step of:
connecting a solderable terminal extension to one end of each said terminal prior to inserting said terminal in said header.

6. The method of claim 1 wherein in step (e) each said terminal is deformed until the stress between said terminal and said through hole is in the range from 1740 psi to 17,400 psi.

7. The method of claim 1 wherein in step (e) each said terminal is deformed until a portion thereof reaches a diameter in the range of 0.006 to 0.010 inch larger than said predetermined diameter of said through hole.

8. The method as claimed in claim 7 including the additional steps of:
(a) forming a taper on each said terminal prior to insertion thereof in said header, said taper formed to have maximum and minimum diameters respectively larger and smaller than said predetermined diameter; and
(b) deforming each said terminal further until the maximum and minimum diameters of said taper are respectively smaller or larger than 0.010 inch and 0.006 inch, respectively, than said predetermined diameter.

9. The method as claimed in claim 8 including the additional steps of:
deforming each said terminal further until the end of said terminal away from said taper forms on additional taper having maximum and minimum diameters respectively smaller or larger than 0.010 and 0.006 inch, respectively, than said predetermined diameter.

* * * * *